United States Patent
Luk et al.

(10) Patent No.: US 8,150,037 B2
(45) Date of Patent: Apr. 3, 2012

(54) APPARATUS AND METHOD FOR SECURE, USER-FRIENDLY DEPLOYMENT OF INFORMATION

(75) Inventors: Mark Y. Luk, Fremont, CA (US); Cynthia Yu Kuo, Pittsburgh, PA (US); Adrian Perrig, Pittsburgh, PA (US); Evan Davis Gaustad, Redondo Beach, CA (US)

(73) Assignee: Carnegie Mellon University, Pittsburgh, PA (US)

( * ) Notice: Subject to any disclaimer, the term of this patent is extended or adjusted under 35 U.S.C. 154(b) by 957 days.

(21) Appl. No.: 12/070,718

(22) Filed: Feb. 20, 2008

(65) Prior Publication Data

US 2008/0298587 A1    Dec. 4, 2008

Related U.S. Application Data

(60) Provisional application No. 60/902,233, filed on Feb. 20, 2007.

(51) Int. Cl.
*H04K 1/00*    (2006.01)
*G01R 33/02*    (2006.01)
*G01R 27/72*    (2006.01)

(52) U.S. Cl. .......................... 380/255; 324/244; 324/228

(58) Field of Classification Search .......... 324/228–243, 324/244, 248
See application file for complete search history.

(56) References Cited

U.S. PATENT DOCUMENTS

| | | | |
|---|---|---|---|
| 4,888,802 A | 12/1989 | Cooney | |
| 5,706,281 A * | 1/1998 | Hashimoto et al. | 370/252 |
| 6,346,815 B1 * | 2/2002 | Carrozzi et al. | 324/318 |
| 6,745,217 B2 * | 6/2004 | Figotin et al. | 708/250 |
| 6,895,092 B2 | 5/2005 | Tomita | |
| 6,918,038 B1 | 7/2005 | Smith et al. | |
| 6,995,558 B2 * | 2/2006 | Butters et al. | 324/244 |
| 7,081,747 B2 * | 7/2006 | Butters et al. | 324/248 |
| 7,132,672 B2 * | 11/2006 | Walther et al. | 250/492.3 |
| 7,197,633 B2 | 3/2007 | Rommelmann et al. | |
| 7,334,125 B1 | 2/2008 | Pellacuru | |
| 8,058,631 B2 * | 11/2011 | Niwayama et al. | 250/492.21 |
| 2003/0056114 A1 * | 3/2003 | Goland | 713/201 |
| 2004/0009768 A1 * | 1/2004 | Waters et al. | 455/422.1 |
| 2004/0158715 A1 * | 8/2004 | Peyravian et al. | 713/171 |
| 2011/0120209 A1 * | 5/2011 | Rose et al. | 73/1.82 |

OTHER PUBLICATIONS

R. Anderson, H. Chan, A. Perrig, "Key Infection: Smart Trust for Smart Dust," University of Cambridge, Carnegie Mellon University.
J.M. McCune, et al., "Seeing-Is-Believing: Using Camera Phones for Human-Verifiable Authentication," 2005 IEEE Symposium on Security and Privacy.
D. Balfanz, et al., "Talking To Strangers: Authentication in Ad-Hoc Wireless Networks," Xerox Palo Alto Research Center.

(Continued)

*Primary Examiner* — Eleni Shiferaw
*Assistant Examiner* — Phy Anh Vu
(74) *Attorney, Agent, or Firm* — Jones Day

(57) ABSTRACT

A method of securely deploying information to a device includes placing a device into a shielded structure and exchanging timing messages between a keying device located inside the shielded structure and a beacon located outside of the shielded structure. The shielded structure is closed. The exchange of timing messages is terminated, and upon termination, the keying device transfers the information via one or more shielded messages to the device, and the beacon jams the frequency at which the shielded messages are transferred. The shielded structure is opened, and the keying device and beacon exchange messages to verify the secure deployment of the information.

23 Claims, 6 Drawing Sheets

OTHER PUBLICATIONS

S. Capkun, M. Cagalj, "Integrity Regions: Authentication Through Presence in Wireless Networks," WiSe '06, Sep. 29, 2006, Los Angeles, CA.

M. Cagalj, et al., "Integrity (I) Codes: Message Integrity Protection and Authentication Over Insecure Channels".

F. Stajano, R. Anderson, "The Resurrecting Duckling: Security Issues for Ad-Hoc Wireless Networks," Security Protocols, 7th Int'l Workshop Proceedings, 1999.

C. Castelluccia, P. Mutaf, "Shake Them Up!" A movement-based pairing protocol for CPU-constrained devices, INRIA and Univ. of California.

J. Lester, et al., "'Are You With Me?'—Using Accelerometers to Determine if Two Devices are Carried by the Same Person," Intel Research Seattle, WA.

L.E. Holmquist, et al., "Smart-Its Friends: A Technique for Users to Easily Establish Connections Between Smart Artefacts".

D. Bichler, et al., "Key Generation Based on Acceleration Data of Shaking Processes" Infineon Technologies AG, Germany, Univ. of Klagenfurt, Austria.

R. Mayrhofer and H. Gellersen, "Shake Well Before Use: Authentication Based on Accelerometer Data," Lancaster University, UK.

* cited by examiner

APPARATUS AND METHOD FOR SECURE, USER-FRIENDLY DEPLOYMENT OF INFORMATION

The present application claims priority from copending U.S. patent application Ser. No. 60/902,233 filed Feb. 20, 2007, and entitled User-Friendly and Secure Cryptographic Key Deployment in Sensor Networks, which is hereby incorporated by reference for all purposes.

BACKGROUND

The present disclosure is directed to the secure deployment of information in a user-friendly manner. The secure deployment of cryptographic keys in a sensor network is explored as one example of the disclosed method and apparatus.

Sensor nodes may be deployed in extreme environmental conditions, such as on major highways or bridges, in naval vessels, and under water [15, 20, 23]. To better protect the nodes and to reduce per-node manufacturing costs, commodity wireless sensors may not be equipped with physical interfaces, such as USB connectors, screens, or keypads. Thus, key setup must take place over the wireless communication interface. That makes key deployment in sensor networks uniquely challenging, as we observe in the three requirements outlined below.

Deploying cryptographic keys in a secure manner to sensor nodes is a prerequisite for secure sensor network operation. If the cryptographic keys are compromised during key setup, attackers can access the data transmitted, even if secure data communication protocols are used.

At first glance, relying on factory-installed keys is an attractive option for key deployment. However, pre-installed keys cannot be trusted unless the entire distribution chain is secured, from factory to customer. Because that is unlikely, keys will be deployed by each customer, and non-expert personnel will be managing the installation process. That means the installation process must be simple, secure, and tolerant of human error.

An active attacker may eavesdrop on wireless traffic and inject malicious traffic. For example, suppose an organization tried to use Diffie-Hellman to secure key setup. Standard Diffie-Hellman key establishment is vulnerable to an active man-in-the-middle attack. The protocol must rely on a shared secret key [2] or on authentic public keys [9] for secure operation. Hence, a wireless setup protocol must be resistant to attacks based on eavesdropping and injection.

Unfortunately, secure key setup has been largely ignored in the sensor network community. For example, the TinySec [12] authors state that key "distribution is relatively simple; nodes are loaded with the shared key before deployment." SPINS also relies on an unspecified key distribution mechanism [17]. Similarly, the plethora of work on random key predistribution also relies on an unspecified mechanism to load sensor nodes with keys [6, 10, 11, 13]. Outside of academic literature, the ZigBee security specification suggests sending the cryptographic key in the clear, "resulting in a brief moment of vulnerability," or imprinting the key during factory installation, which customers may not trust [24].

There had been a few attempts at building a key deployment system for commodity sensor nodes. However, as we describe five related schemes below, we also discuss their shortcomings.

Resurrecting Duckling sets up a secure shared key by electrical contact [21,22]. This scheme is secure, yet requires additional specialized hardware for each device. Talking to Strangers relies on a location-limited channel, such as audio or infrared, as an out-of-band channel for key setup [1], and such a channel is not commonly found on sensor nodes, sometimes referred to herein as "motes". In Seeing-is-Believing, an installation device equipped with a camera or a bar code reader reads a public key as 2 2D barcode on each device [16]. Again, such specialized hardware is uncommon among sensor motes. In On-off Keying, the presence of an RF signal represents a binary '1,' while its absence represents a binary '0' [3, 4]. Assuming that an attacker cannot cancel out RF signals, the attacker can only modify authentic messages by changing 0's to 1's—but not the inverse. By carefully selecting the encoding scheme, On-off Keying ensures that the attacker is unable to modify a packet during transmission. Unfortunately, On-off Keying requires a threshold value to differential between a '0' and '1,' and this value itself needs to be authenticated. Key Infection simply sends secret keys in the clear, assuming that an attacker would arrive at a later point in time [5]. Similar to ZigBee, this results in a brief window of vulnerability. Thus, a need exists for a secure, user-friendly protocol for initial key deployment in sensor networks.

SUMMARY

One embodiment of this disclosure is directed to a method and apparatus for setting up secure cryptographic keys (either shared secret symmetric keys or authentic public asymmetric keys) between communicating nodes. Without loss of generality, we consider the problem of setting up a unique shared secret key between a base station and each node.

The disclosed method and apparatus is referred to in our other literature as Message-in-a-Bottle or (MIB). See, for example, Kuo, et al. Message-In-a Bottle: User-Friendly and Secure Key Deployment for Sensor Nodes, SenSys '07, Sidney, Australia, which is hereby incorporated in its entirety for all purposes. The disclosed method enables a sensor network to establish a secret with a new node in the absence of prior shared secrets between the two devices. The disclosed method and apparatus rely solely on the wireless communication interface, ensuring that our approach is applicable to any commodity wireless sensor node. In the following section, we first present an overview of our method. That is followed by a detailed description of our protocol.

Participants

Five parties participate in disclosed method: a base station, a device for transferring the information, referred to herein as a keying device, a beacon, an un-initialized node, and a user. The goal is to deploy a key (more generally, information) that will be a shared secret between the base station and the new node. Below, we introduce the participants in the method and provide an intuition about how they interact with one another.

Base Station

The base station delegates key deployment to two devices: the keying device and the beacon. The base station is not directly involved with key deployment.

Keying Device

During key deployment, the keying device and the un-initialized node are placed inside a Faraday cage or other shielding type of structure that provides the function of a Faraday cage. The keying device sends keying information to the node when the Faraday cage is closed, which the new node later uses to derive the key.

Beacon

During key deployment, the beacon remains outside of the Faraday cage. The beacon has three purposes: 1) detect when the Faraday cage is closed; 2) jam the communication channel to prevent an eavesdropper from overhearing keying information leaked from the Faraday cage; and 3) inform the user of the status of the deployment.

User

The user of method is the person (e.g., a technician) who deploys keys onto a new node.

New Node

The new node can either be un-initialized, initialized, or rejected. When node M is first powered on or reset, it has no prior keying information and is un-initialized. Once the node receives a key, it is initialized. The key is a shared secret between the base station and the new node only. If an error occurred during key deployment, the node is rejected. Rejected nodes do not share a valid secret key with the base station.

Overview of Protocol

Initially, the keying device and beacon exchange authenticated heartbeat messages. The messages are used to determine whether the Faraday cage is open. In addition, the heartbeat messages are also used to establish loose time synchronization.

To initiate deployment, the user places the keying device and the new node inside the Faraday cage. The beacon remains outside of the Faraday cage. Once the Faraday cage is closed, the keying device and the beacon can no longer exchange heartbeat messages.

Inside the Faraday cage, the keying device begins key deployment. The keying device sends a key to the new node in several segments, although one segment is withheld. We refer to messages exchanged inside the Faraday cage as shielded messages. Meanwhile, the keying device monitors the background noise in the Faraday cage. If the background noise exceeds a certain threshold (which indicates that the protocol is under attack or that the Faraday cage is faulty), key deployment is aborted.

Outside of the Faraday cage, the beacon jams the wireless frequency of the shielded messages during key deployment; this overpowers any shielded messages that may leak. After a set time period, the beacon indicates to the user that key deployment has completed. The user opens the Faraday cage. If the protocol encountered an error, the keying device informs the beacon, and the beacon informs the user. If the protocol executed as expected, the keying device sends the following information to the beacon: the last key segment, the time periods in which shielded messages were exchanged, and a random challenge-response pair. The beacon uses the time periods to confirm that the jamming and the key exchange occurred simultaneously. The beacon then sends the last key segment and the challenge to the new node. The new node reconstructs the key using all of the segments and computes the response to the challenge. After the beacon verifies the new node's response, it informs the user that deployment succeeded.

From a user's perspective, the key deployment process is simple.

Protecting Shielded Messages

We now highlight five techniques in our method that protect shielded messages; this prevents a powerful adversary from attacking the key setup protocol. (A rigorous analysis will be presented later.)

1. All shielded messages are transmitted at minimum power.

2. The Faraday cage greatly attenuates the shielded message transmissions.

3. The beacon jams the wireless frequency of the shielded messages—at full power—outside of the Faraday cage. If any wireless signals leak from the Faraday cage, the beacon's stronger signal will interfere with and overpower the shielded messages.

4. The radios of many sensor nodes transmit in spread spectrum to achieve a higher gain. Shielded messages do not use spread spectrum.

5. The deployed secret key is a function of all the shielded messages. To obtain the key, attackers need to overhear all of the shielded messages.

Our method and apparatus may be generalized from the foregoing detailed description of our secure key deployment embodiment. It will be apparent to those of ordinary skill in the art that information other than a cryptographic key may be deployed including any type of information including, but not limited to, authentic information. Devices other than wireless sensors may be used. For example, identity information may be deployed or transferred to a cell phone. In our secure key deployment embodiment, we assume that each of the components is a separate entity. However, some components may be combined. For example, the keying device may be constructed as an integral part of the Faraday cage, which may in turn be any type of shielded structure. The key in the secure key deployment embodiment is transferred via radio frequency transmission, but other means, such as light, may be used to transfer the information. In the secure key deployment embodiment, the keying device and the beacon sense the termination of the heartbeat messages. That functionality may be replaced with any type of switch that senses when the shielded structure is closed and conveys that information to the keying device and the beacon. Thus, the present invention may be more generally stated as follows.

A method of securely deploying information to a device is comprised of placing a device into a shielded structure and exchanging timing messages between a keying device located inside the shielded structure and a beacon located outside of the shielded structure. The shielded structure is closed. The exchange of timing messages is terminated and, upon termination, the keying device transfers the information via a plurality of shielded messages to the device and the beacon jams the frequency at which the shielded messages are transferred. The shielded structure is opened and the keying device and beacon exchange messages to verify the secure deployment of the information.

Our method and apparatus is a user-friendly protocol for secure information deployment. Our method and apparatus represent the first secure key setup protocol designed for commodity sensor networks. Those, and other advantages and benefits, will be apparent from the description below.

BRIEF DESCRIPTION OF THE DRAWINGS

For the present disclosure to be easily understood and readily practiced, the present disclosure will now be described, for purposes of illustration and not limitation, in conjunction with the following figures wherein.

DETAILED DESCRIPTION

Problem Definition

Consider the following problem: when a customer receives a shipment of sensor nodes, how can a shared secret be set up between a trusted base station and each new un-initialized node, using only wireless communication? A viable solution provides each of the following properties:

Key secrecy—An attacker has (at best) a negligible probability of compromising the shared secret.

Key authenticity—A new node receives the key that the base station intended for it to receive.

Forward secrecy—Compromising the key on one node should not compromise the keys on previously deployed nodes.

Usable—A usable protocol is intuitive for non-expert users.

Robust to user error—It should be difficult for the installer to introduce a vulnerability into the system. A human error should result in failing to set up a key—not in a key compromise.

No additional hardware per node—For commodity sensor nodes, the economics of large-scale manufacturing preclude dedicated hardware components for key setup.

Assumptions

We first assume that installation personnel are trustworthy. These installers may not be security experts, but we do assume that they can accurately follow simple directions, such as "if the red light is lit, discard the sensor node."

Second, we assume the trusted computing base consists of the base station and the device used to perform key deployment (i.e., the keying device introduced above).

Attacker Model

The goal of the attacker is to compromise the keys shared by the base station and the sensor nodes.

We adopt the Dolev-Yao attacker model, where an attacker is present in the network and can overhear, intercept, and inject any messages into the radio communication channel. An attacker could take the form of a more powerful device, such as a laptop equipped with a directional antenna. The attacker is assumed to be present before, during, and after key deployment. Such an omnipotent attacker is in line with other research in this area [3, 16].

Description of Disclosed Method (Protocol)

The notation used to describe our protocol and cryptographic operations is shown in the following Table I. Note that the ID of a node can be used to refer to the node itself (e.g., A represents both the node A and the ID of node A);

TABLE I

| | |
|---|---|
| A → B : (M) | A sends message M to B. |
| S | Base station. |
| D | Keying Device. |
| B | Keying Beacon. |
| M | New sensor node to receive key. |
| MS | Master Secret known only to S. |
| $K_D$ | Deployment key used by Keying Device D to bootstrap new keys. |
| $K_{DB}$ | Encryption key between D and B. |
| $K'_{DB}$ | MAC key between D and B. |
| $K_M$ | Key to deploy onto node M. |
| $N_A$ | A nonce generated by device A. |
| $PRF_K(X)$ | A pseudo-random function computed over ID of node X, keyed by K. |
| $H(X)$ | A cryptographic hash function computed over X. |
| $E_K(M)$ | Encryption of message M with key K. |
| $MAC_K(M)$ | Message authentication code of message M with key K. |

Setup

Figure 1:
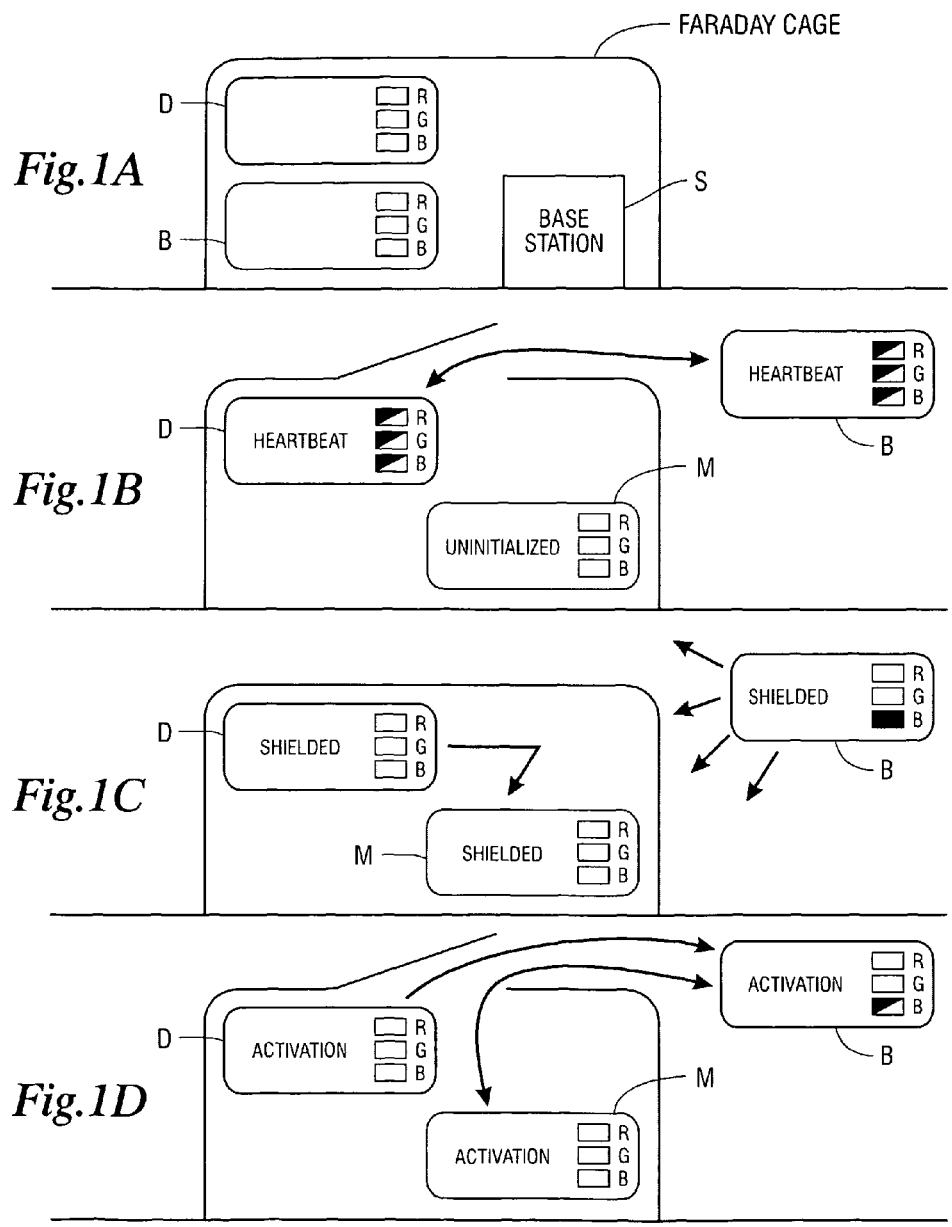
FIGS. 1A-1D illustrate the various components of the system including the Faraday cage, keying device D, beacon B, base station, and sensor (node or mote) on which the cryptographic key is to be deployed in various positions during the method (sometimes referred to as a protocol) disclosed herein.

Turning to FIG. 1A, prior to key deployment, the base station S assigns keys to the keying device D and the beacon B. This step represents the delegation of key deployment from the base station to these two devices. The signals used to set up the keying device D and the beacon B are shown in the following Table II.

TABLE II

| | |
|---|---|
| S : | $K_D = PRF_{MS}(D)$ |
| | $K_{DB} = PRF_{MS}(D\|\|B\|\|0)$ |
| | $K'_{DB} = PRF_{MS}(D\|\|B\|\|1)$ |
| BS → D : | <$K_D,K_{DB},K'_{DB}$,initial_timestamp> |
| BS → B : | <$K_{DB},K'_{DB}$,initial_timestamp> |
| D : | c = 0 |
| User : | User places D inside of the Faraday cage and B outside of the Faraday cage |

Because the keying device D and the beacon B do not share any prior secrets with the base-station S, deploying keys onto these devices may be difficult. We suggest placing both devices and the base station S inside a large Faraday cage as shown in FIG. 1A. Alternatively, we can use specialized keying devices with a special physical interface, such as a USB connector, over which the keys can be securely transmitted.

As shown in Table II above, the base station S derives a set of keys for these devices using a pseudo-random function PRF, keyed with a master secret MS known only to the base station. First, the base station derives an encryption key $K_{DB}$ and MAC key $K'_{DB}$ for communication between D and B. Next, S derives deployment key $K_D$ for the keying device, which is used by D to derive secret keys for the new nodes. After each successful deployment, D replaces the deployment key with the hash of the key $K_D=H(K_D)$. This creates a hash chain of deployment keys, ensuring that a new deployment key is used for each node. Using a hash chain provides forward secrecy, because an attacker cannot recreate previously deployed keys. Finally, D uses a counter c to track how many times $K_D$ has been updated.

After completing the initial setup, if the user had used a special interface instead of the Faraday cage, the user places the keying device D inside the Faraday cage while the beacon B remains outside as shown in FIG. 1B.

Step 1 of Key Deployment: Exchange Heartbeat Messages

For this step of the method, the components are positioned as shown in FIG. 1B. The base station S is no longer needed, the beacon B is positioned outside the Faraday cage, and the sensor or mote to which the key is to be deployed is placed in the Faraday cage with the keying device D. The keying device D and beacon B exchange the authenticated heartbeat messages shown in Table III below to determine whether the Faraday cage is closed. Heartbeat messages require strong authentication; without authentication, an attacker can masquerade as the keying device to the beacon.

TABLE III

| | |
|---|---|
| B → D : | <timestamp,$MAC_{K_{DB}}$(B‖timestamp)> |
| D → B : | <$MAC_{K_{DB}}$(D‖timestamp)> |

Loose time synchronization was originally established by the base station during the setup phase (FIG. 1A), where the base station sends an initial timestamp to both the keying device D and the beacon B. The heartbeat messages in this step (FIG. 1B) maintain time synchronization. The beacon B simply sends its current timestamp, which is a monotonically increasing counter. The keying device D adjusts its internal timer and replies immediately. Note that the very first time synchronization message exchange requires three rounds of communication to ensure mutual authentication and freshness.

Step 2: Place New Node M inside Faraday Cage

The user initiates the key deployment protocol by turning on new node M and placing it inside the Faraday cage (see FIG. 1B). Once the user closes the Faraday cage as shown in FIG. 1C, the keying device D and beacon B can no longer exchange authenticated heartbeats. Both devices move to the next step in the protocol.

Step 3a: Deploy Cryptographic Keys

After the Faraday cage is closed; the keying device D performs three tasks: (1) generate key $K_M$, which will be deployed onto the un-initialized node M; (2) transmit keying information to M: and 3) monitor background noise.

All messages exchanged in this step are shielded messages. Our protocol protects the shielded messages in several ways. First, the Faraday cage greatly attenuates the signal strength of the messages. Also, shielded messages are transmitted at minimum power and without spread spectrum technology. The shielded messages are shown in Table IV.

TABLE IV

| | |
|---|---|
| D → * : | <Key_Deployment_Hello‖D‖c> |
| M → D : | <Key_Deployment_Hello_Ack‖D‖c‖M> |
| D : | $K_M = PRF_{K_D}(M)$ |
| | $r_i \xleftarrow{R} \{0,1\}^{80} \forall i \in [1, s]$ |
| | $k = K_M \oplus r_1 \oplus r_2 \oplus ... \oplus r_s$ |
| | $h = H(K_M)$ |
| D → M : | (h) |
| for i = 1...s | |
| D → M : | ($r_i$) |
| D : | $t_i$ = current time |
| M → D : | <H($r_i$)> |
| D : | $K_D = H(K_D)$ |
| | c + + |

The keying device D generates key $K_M$ by computing the pseudo-random function PRF over M, keyed with the current value of deployment key $K_D$. $K_D$ is then replaced by the hash of $K_D$. In addition, the keying device transmits the hash of $K_M$, or h, to the new node M as a commitment; M can later verify the correctness of $K_M$ against h.

Next, the keying device generates s segments of keying information and transmits them to the new node as follows. First, it generates s random nonces $r_1, r_2, \ldots r_s$. It then repeatedly XORs key $K_M$ with each value of $r_i$ to generate an activation key k. Finally, the random nonces $r_1, r_2, \ldots, r_s$ are sent to M over s rounds of communication, along with counter c. M uses these messages to reconstruct $K_M$, as $K_M = k \oplus r_1 \oplus r_2 \ldots \oplus r_s$. Thus, an attacker must overhear all s messages to compromise the key. The time periods of these message exchanges are also recorded as $(t_1, t_2, \ldots, t_s)$.

The keying device's third task is to monitor the background noise to ensure that the Faraday cage is indeed closed. If the Faraday cage is not attenuating the signals as required in the protocol (e.g., the Faraday cage is not closed properly), the keying device will sense the presence of the beacon and abort key deployment.

D considers the key deployment to be a success as long as M participates in the protocol as expected.

Step 3b: Outside the Faraday Cage

Meanwhile; the beacon B remains outside of the Faraday cage. The beacon times how long the Faraday cage is closed and jams at full power. The jamming has two purposes. First, it prevents an eavesdropping attack, because the white noise overpowers any leaked shielded messages. It also enables the keying device to determine when the Faraday cage is opened prematurely. The jamming begins at time $t_s$ and lasts for 5 seconds, which is more than enough time for the keying device to complete Step 3a. After 5 seconds, the beacon B notifies the user to open the Faraday cage.

Step 4: Key Activation and Verification

After the user opens the Faraday cage as shown in FIG. 1D, M's key must be activated and verified. If the keying device and beacon both agree that no errors occurred in the previous steps, they activate key $K_M$. Finally, the beacon B verifies that M has the correct key using a challenge-response exchange. After verification, M considers itself as initialized. The messages exchanged in this step are shown in Table V.

TABLE V

| | |
|---|---|
| D : | $ch \xleftarrow{R} \{0, 1\}^{80}$ |
| | $rp = E_{K_M}(ch)$ |
| | $m = \{k, ch, rp, t_1, t_s\}$ |
| D → B : | <$E_{K_{DB}}(m), MAC_{K_{DB}}(E_{K_{DB}}(m))$> |
| // If B agrees that there are no errors, and it was jamming during $t_1$ to $t_s$ | |
| B → M : | <k,ch> |
| M : | $K_M = (r_1 \oplus r_2 \oplus ... \oplus r_m) \oplus k$ |
| // M verifies if $H(K_M) == h$ | |
| M → B : | <$MAC_{K_M}(ch)$> |
| // B verifies response. If $MAC_{K_M}(ch) == rp$ | |
| B : | signals success |

Key activation reveals the last segment of keying information to the new node. First, if D considers the deployment to be successful, it encrypts activation key k and sends it to the beacon B, along with the time periods in which D was sending protocol messages. Beacon B considers the deployment to be successful if it was jamming during the same time periods. This comparison requires loose time synchronization, which is established in the heartbeat messages. If the beacon B was not jamming during the appropriate time periods, it signals an error and aborts key deployment. Otherwise, the beacon B decrypts activation key k and forwards k to M along with a challenge. Upon receiving activation key k, new node M has all the information needed to generate $K_M$. To verify its correctness, node M hashes $K_M$ and compares it against the commitment h received in Step 3.

The beacon B verifies that M has the correct key using a simple challenge—response protocol. It sends a random challenge ch to M (either along with the key k as shown in Table V or as a separate message) and verifies that M responds correctly with $rp = MAC_{K_M}(ch)$.

If M responds correctly, the beacon B flashes a success sequence on its LEDs, indicating to the user that key deployment succeeded.

Figure 2:
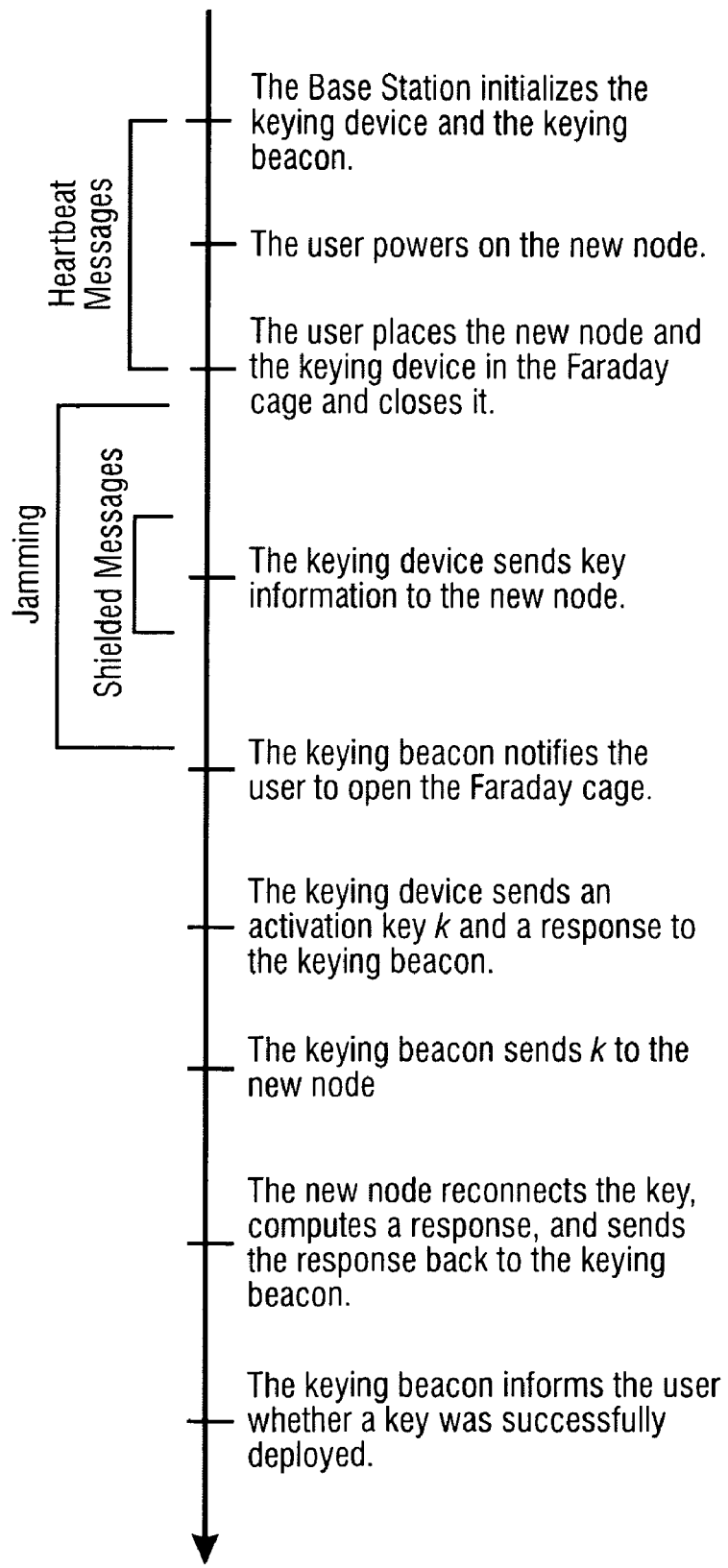
FIG. 2 is a timeline of the disclosed method for secure, user-friendly, cryptographic key deployment.

If the keying device D or the beacon B recognized any errors during the key deployment process, the beacon B flashes a failure sequence on its LEDs. A summary of the protocol just described can be found in FIG. 2.

Suggested Implementation

This section describes our implementation of our protocol on Moteiv's Telos motes. Telos motes feature TI MSP430 micro-controllers and ChipCon CC2420 radios. We first explain the software design and implementation, which was written in nesC and executed on TinyOS. Next, we measured the radio signal strength of our implementation. Using these measurements, we present a mathematical analysis on the likelihood of an eavesdropper obtaining the key.

Protocol Implementation

Beacon

Figure 3A:
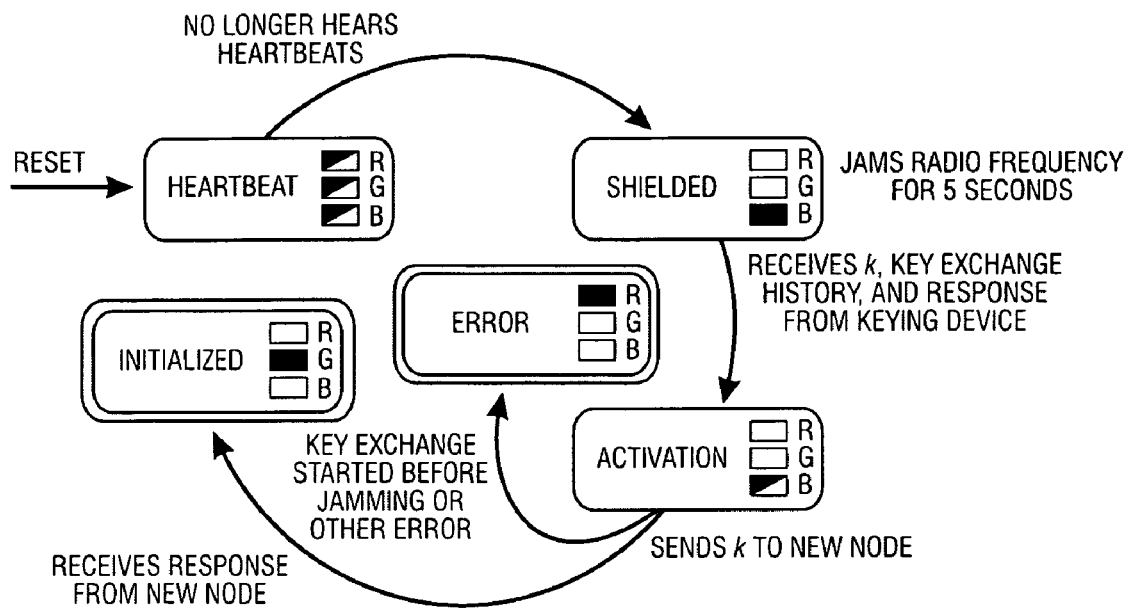
FIG. 3 illustrates in (a) the state diagram for the beacon, in (b) the state diagram for the new node, and in (c) the state diagram for the keying device. A fully shaded box indicates an LED is lit; a half shaded box indicates that an LED is blinking.

The beacon has three purposes: 1) detect when the Faraday cage is closed; 2) jam the communication channel to prevent an eavesdropper from overhearing keying information leaked from the Faraday cage; and 3) inform the user of the status of the deployment. The beacon's state diagram is shown in FIG. 3A.

The beacon starts in the Heartbeat state. In this state, it blinks all three LEDs to indicate that it is exchanging heartbeat messages with the keying device. Once the Faraday cage is closed, the beacon misses several consecutive heartbeats from the keying device. This causes the beacon to transition into the Shielded state. In the Shielded state, the beacon illuminates its blue LED and jams at full power. After 5 seconds, the beacon transitions into the Pre-activation state. It blinks its blue LED and challenges the new node with a value received from the keying device. A correct response causes the beacon to transition into the Initialized state. The successful deployment is indicated by illuminating the green LED. Any error causes the beacon to transition into the Error state, where the red LED is lit.

The protocol was designed with simplicity as one of the main goals. The user only needs to monitor the LEDs on the beacon.

New Node

Figure 3B:
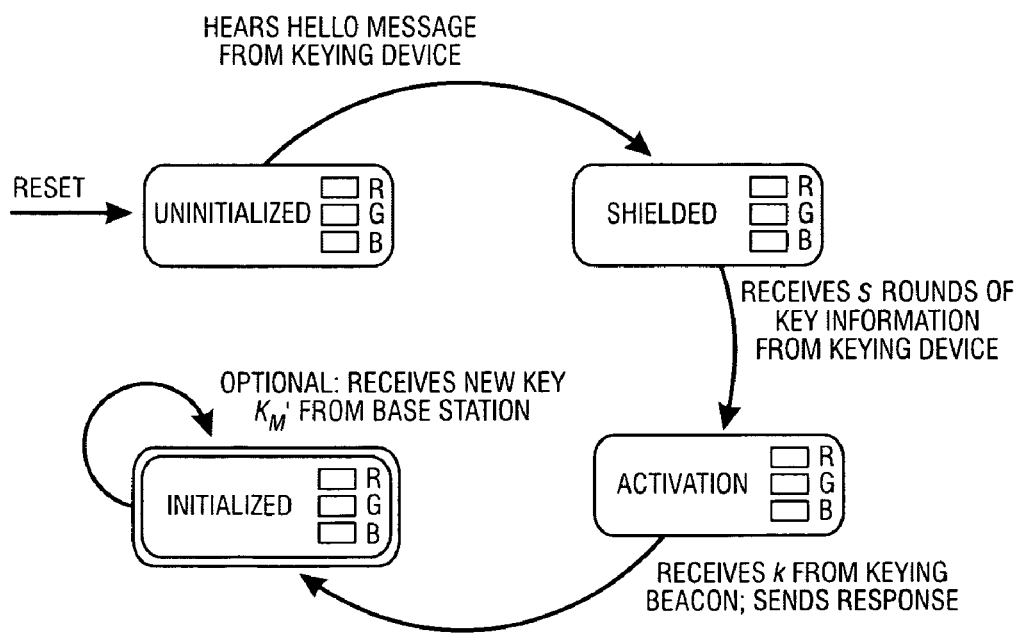

As shown in FIG. 3B, an uninitialized node powers on and waits for keying information from the keying device. After it receives enough keying information to compute key $K_M$, it responds to the challenge issued by the beacon.

Keying Device

Figure 3C:
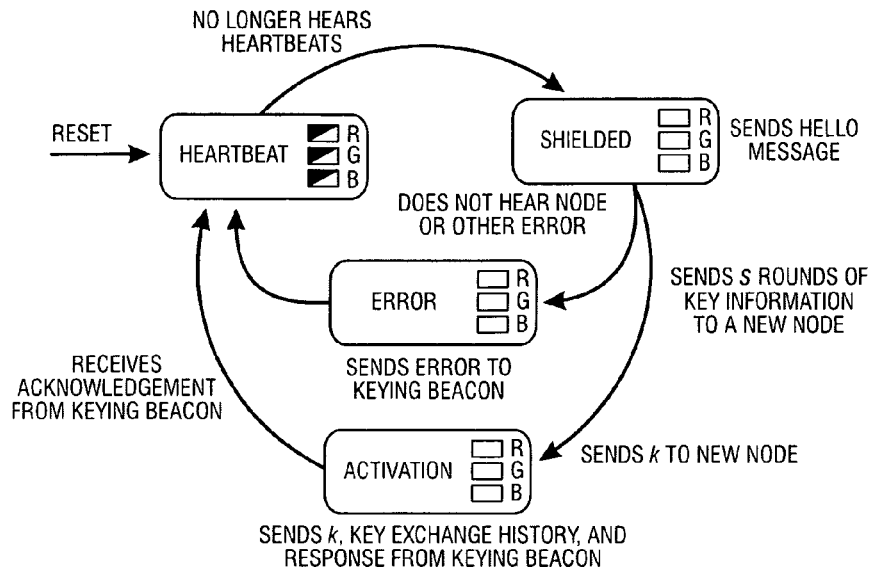

The keying device computes and deploys key KM onto the new node, as illustrated in FIG. 3C. Like the beacon, the keying device starts in the Heartbeat state. It blinks all three LEDs and exchanges heartbeats with the beacon. After the user closes the Faraday cage and the keying device no longer hears heartbeat messages, it enters the Shielded state. In this state, the keying device locates the new node and transmits multiple rounds of keying information to the new node. If this is successful, the keying device transitions into the Pre-activation state when the user opens the Faraday cage. In the Pre-activation state, the keying device sends an activation key and a challenge-response pair to the beacon. If an error occurred in the Shielded state, the keying device transitions into the Error state instead, and an error message is sent to the beacon. Finally, the keying device returns to the Heartbeat state, ready for the next deployment.

Radio Measurement

We measured the strength of the keying device's signal inside and outside of the Faraday cage. The data were used to confirm that (1) the uninitialiied node inside the Faraday cage receives the keying device's transmissions without difficulty and (2) an attacker outside of the Faraday cage cannot eavesdrop on the shielded messages. We also examine what happens if the beacon fails to jam while shielded messages are exchanged.

Our assumptions follow. We assume that the keying device always broadcasts at the minimum transmit power of $P_t$=−24 dBm [7] of the CC2420 chip. We also assume that the beacon broadcasts Gaussian white noise in a 5 MHz bandwidth around the carrier frequency of the keying device at a power of 5 dBm, so as to be within the maximum power spectral density (PSD) limit specified for the 2.5 GHz ISM band. Our measurements of the galvanized steel pipe used as a Faraday cage show that the minimum attenuation through the pipe is $L_{cage}$=84 dB. Further, since the keying device and the new node are placed next to each other, the attenuation between them is $L_{DM}$=3 dB in our testing environment. We assume that the eavesdropper may have an antenna of gain 10 dB, which is typical of a cell-site antenna.

Key Reception at New Node

Thus, the received Signal-to-Interference Ratio (SIR) of the sensor node is −24 dBm−3−(5 dBm−84)=52 dB while the Signal-to-Noise Ratio (SNR) is −24 dBm−3−(−106 dBm)=79 dB. Note that the noise level of −106 dBm is obtained from the thermal noise PSD of −113 dBm/MHz [19] and the link bandwidth of 5 MHz. Both are significantly more than the minimum SNR of 1 dB required [7] for a packet error rate of 1%, so that the key reception at the sensor is lossless.

Key Reception at Eavesdropper with Jamming

With a jammer (i.e., beacon) of power 5 dBm, even if we assume the smaller attenuation of 50 dB of the cage, the SIR at any point outside the cage will be smaller than −24 dBm−50−5 dBm=−79 dB. This is substantially smaller than the minimum SNR of −15 dB to achieve capacity. Thus, eavesdropping will not be possible. More importantly, this is true even if the eavesdropper uses a high-gain antenna, since both keying-signal as well as the jammer signal will be equally amplified.

Key reception at eavesdropper without jamming

The minimum SNR required to achieve channel capacity for 250 kbps over a 5 MHz channel (based on the specifications of the CC2420 chip) is given by 250 kbps=5 MHz×log2 (1+SNR). Thus, the required SNR is −15 dB. Since channel capacity requires an ideal code, which is not present in the CC2420 chip, this value of SNR is the most optimistic value from the point of view of the eavesdropper. With thermal noise of −106 dBm, and assuming an eavesdropper antenna gain of 10 dB, this implies that the required sensitivity must be at least −106 dBm−10=−116 dBm. Assuming that the Faraday cage works perfectly, the distance $d_{min}$ from the keying device beyond which eavesdropping will fail is given by the free space loss equation [19], i.e., receive sensitivity in dB=$P_t$−20 $\log_{10}$ (4π$d_{min}$/λ)−$L_{cage}$. Note that free-space propagation occurs over short distances, as in our scenario. Over short distances, there is no fading. Further, if there is shadowing, it will only serve to increase the attenuation. Since the carrier wavelength λ=12 cm, we calculate $d_{min}$=2.5 cm. If we allow for leakage from the Faraday cage, we can specify that the beacon senses this leakage if the signal level outside the cage is above 74 dBm. In that case, the Faraday cage must have an attenuation of at least −24 dBm+74 dBm=50 dB, for the leakage to go undetected. Repeating the $d_{min}$ calculation with the reduced $L_{cage}$=50 dB, we find that $d_{min}$=1.2 m. In either case, we can ensure that eavesdropping is not possible, as long as a two meter radius around the keying apparatus is physically secure.

User Study

Our protocol was designed to be simple and accessible to a wide range of individuals. For the user study, we recruited university students and staff who are not colorblind as our implementation relies on the user's ability to distinguish between different colored LEDs. Most users will use the LED colors for differentiation, but colorblind users could use the locations of lit LEDs. Our test nodes were sheathed in bubble wrap for protection, obscuring the LED locations. We did not expect that users would have any prior knowledge or experience with sensor nodes. We first describe the nodes' capabilities. We then introduced the concept of encryption and the need for secure key deployment.

Figure 4:
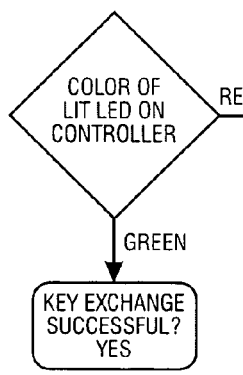
FIG. 4 is a flowchart provided to users with a sheet for recording results.

Each user was given a sheet with installation directions, a sheet on which to record the results, and four nodes for key deployment. The installation directions are shown in Appendix A. The sheet for recording results included the flowchart in FIG. 4. Of the four nodes, two 'good' nodes were configured correctly for key deployment. The remaining two nodes simulated a variety of errors and attacks:

1. From the user's point of view, the beacon turns red, and the new node behaves exactly as expected. (None of the LEDs on the new node blinks). There are several possible causes for this situation: the new node is defective and failed to complete the key exchange process; the beacon failed to jam while the shielded messages were exchanged; shielded messages leaked from the Faraday cage (because the Faraday cage was improperly closed, the user opened the Faraday cage too early, or the Faraday cage itself is leaky); or the keying device heard jamming signals during key deployment.

2. From the user's point of view, the beacon turns red, but the new node's green LED is also lit. This situation occurs if the new node is defective or malicious. While unlikely, we included this scenario to confuse the user with a conflicting signal. For each of the four nodes, participants followed the installation directions and determined whether a key was successfully deployed. The order of the nodes was randomly assigned.

Results

Because of the simplicity of our protocol, participants were able to follow our directions with ease. Initially, many of the participants were apprehensive about working with the sensor nodes. Afterwards, several participants described the protocol as "simple," "easy," or even "self-evident." We tested twenty individuals, including undergraduate students, graduate students, and staff members. Eight participants were female; twelve were male. Participants' ages ranged from 18 to over 50. Of the twenty participants, nineteen correctly categorized the four nodes. The remaining participant carelessly circled an incorrect option while rushing to finish the study. Our results are summarized in Table VI

TABLE VI

| Summary | |
|---|---|
| Total number of participants | 20 |
| Number of motes tested by each participant | 4 |
| Total number of errors | 1 |
| Motes tested by each participant | |
| Number of 'good' motes | 2 |
| Number of 'bad' motes | 2 |
| Errors | |
| Number of false negatives (identifying an unsuccessful key deployment as successful) | 0 |
| Number of false positives (identifying a successful key deployment as unsuccessful) | 1 |

Extension of our Protocol to Multiple Nodes

Our user study demonstrated that people are able to follow our protocol's instructions quickly and accurately. However, a few participants commented that it would be tedious to configure many nodes in this manner. As a next step, we extended our protocol for key deployment on multiple nodes. We placed the following constraints on the extension:

1. From the user's perspective, no additional work should be required. Deployment for multiple nodes should be the same as deployment for one node.

2. The protocol should be able to handle an arbitrary number of nodes.

3. It should be easy to deploy group keys or individual keys.

4. The Faraday cage should be easy to open and close.

Placing multiple new nodes in the Faraday cage introduces two significant challenges. First, the keying device and the beacon need some way to determine when the protocol has finished. In particular, the beacon must jam and notify the user to open the Faraday cage at the appropriate times. Times will vary, depending on the number of nodes in the Faraday cage. The keying device also needs to know when all the nodes have received their keys so that it can generate and send the activation keys and validation strings to the beacon. Thus, the keying device and beacon must know how many new nodes are placed in the Faraday cage. Second, the nodes must be counted without user intervention. Users may miscount the number of nodes—especially as the number of nodes increases.

Figure 5:
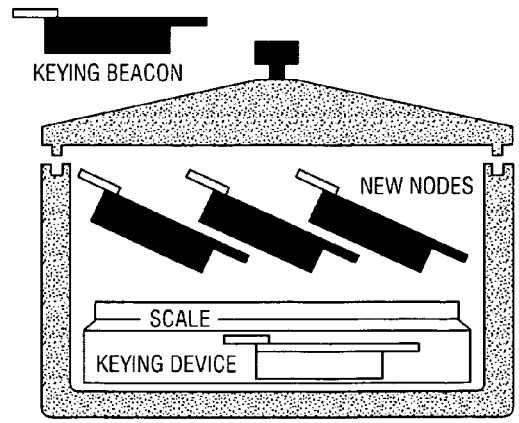
FIG. 5 is a Faraday cage designed to receive multiple nodes and a scale. The keying device is attached to the scale and weight is used to calculate the number of nodes in the cage.

Our protocol uses a scale to count the number of new nodes. The number of nodes is calculated using the weight of one node. (For example, each Telos mote weighs approximately 60 grams.) A batch can only contain nodes of the same type. The keying device is then attached to the scale to obtain the reading. An illustration of the setup is shown in FIG. 5. Note that attaching the keying device to the scale prevents an error scenario where the user accidentally swaps the keying device and the beacon. Because the keying device is physically attached to the scale, we design the physical casing such that the beacon cannot be connected to the scale. On the protocol level, a few changes are required to support multiple nodes.

1. The keying device sends the most recent node count to the beacon in the heartbeat message.

2. The beacon estimates the time needed for shielded messages exchange and jams for the duration.

The keying device verifies that the number of responsive nodes in the Faraday cage matches node count from the scale. If these numbers do not match, the keying device aborts the protocol and returns an error.

4. The keying device assigns an index number to each node to facilitate key assignment. (We assume that each node receives a unique key. Of course, this could be changed to a group key.)

Figure 6A:
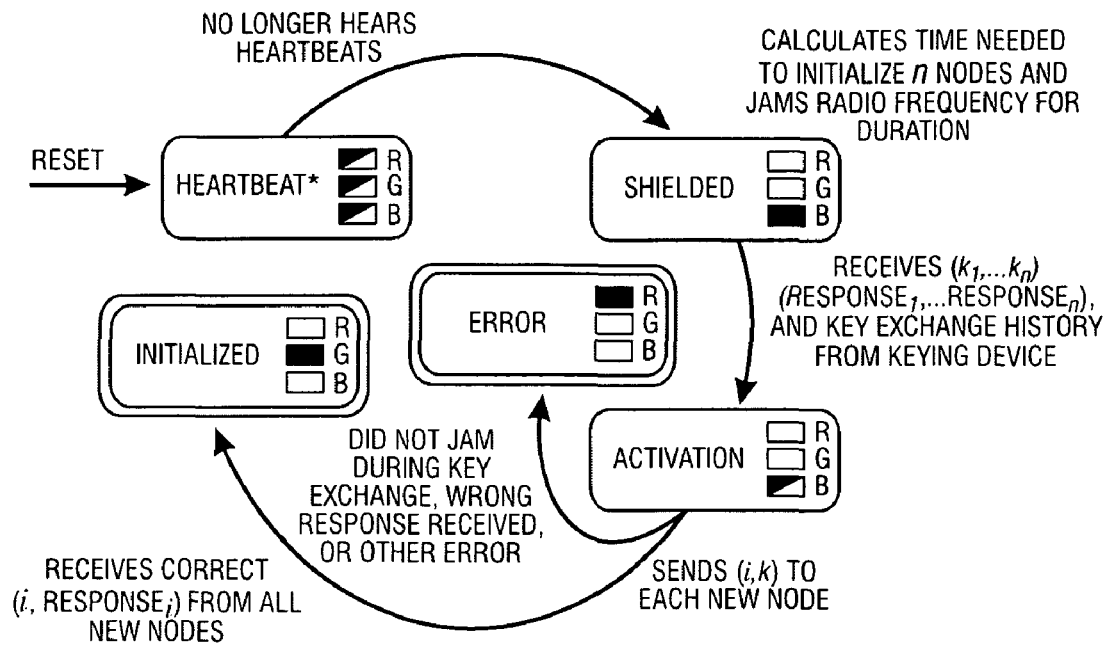
FIG. 6 illustrates in (a) the state diagram for the beacon, in (b) the state diagram for the new node, and in (c) the state diagram for the keying device for the case in which multiple nodes are provided with keys. A fully shaded box indicates an LED is lit; a half shaded box indicates that an LED is blinking.
Figure 6B:
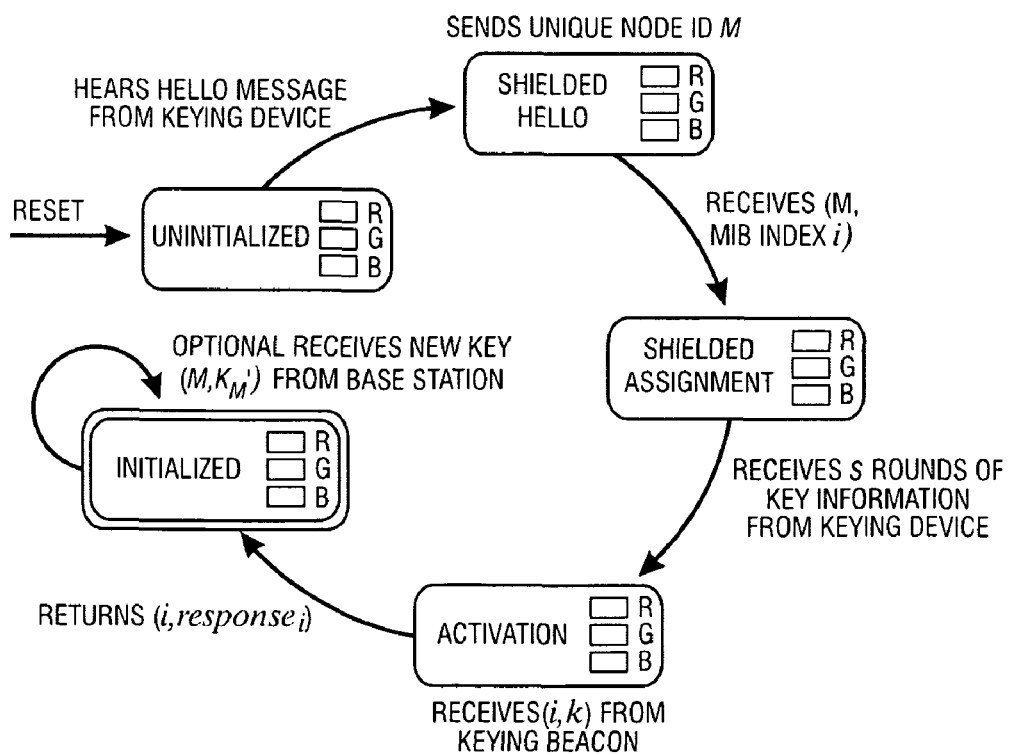
Figure 6C:
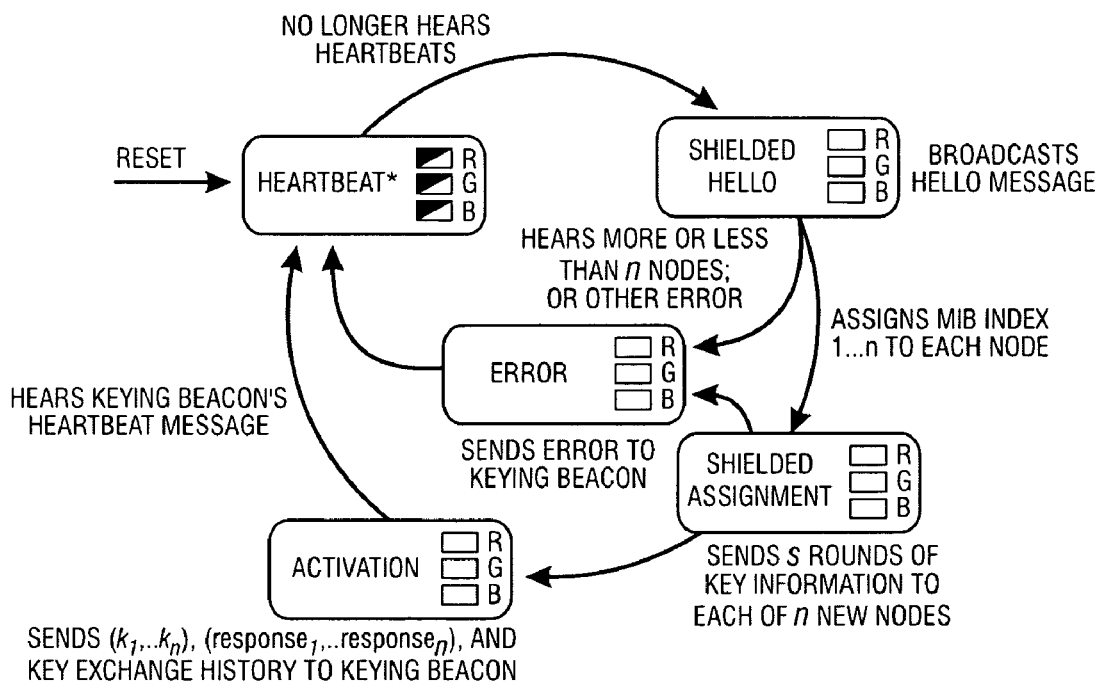

These modifications are reflected in FIG. 6A, which illustrates a state diagram for the beacon for multiple nodes, FIG. 6B which illustrates a state diagram for a new node amongst a plurality of nodes receiving keys, and FIG. 6B which illustrates a state diagram for the keying device for multiple nodes. Because LEDs have limited feedback capability, the entire batch of nodes must be discarded if an error occurs.

Uses for our Protocol

Keys deployed using our protocol can be used to bootstrap any other key establishment mechanism that requires pre-installed keys. For example, they can be used to securely download a pseudo-random key pool used in random key predistribution. Alternatively, initial keys can be used to bootstrap keys for SPINS, TinySec, ZigBee, or MiniSec.

Variations on our Protocol

Our protocol implements key deployment over a wireless communication channel. However, the protocol could be adapted to use the sensors themselves. For example, a network comprised of light sensors could implement our protocol using visible light as the communication channel. Then, any solid, opaque container takes the place of the Faraday cage; the function of the Faraday cage changes from attenuating radio signals to blocking the escape of light. The beacon could also radiate light instead of jamming radio signals. Similarly, the protocol can be adapted for other modalities, such as acoustic or infrared. Other means for determining that the shielded structure is closed including, but not limited to, mechanical switches, may be used and the protocol revised to accommodate such changes in hardware. The disclosed protocol utilizes a number of techniques for defending against eavesdropping including, but not limited to, use of the Faraday cage, jamming, use of low signal strength for the shielded messages, simple encoding, use of multiple shielded message, among others. The reader will recognize that these techniques may be used together, separately, or in various combinations while remaining within the scope of the present disclosure.

REFERENCES

Incorporated Herein by Reference

[1] D. Balfanz, D. Smetters, P. Stewart, and H. C. Wong. Talking to strangers: Authentication in ad-hoc wireless networks. In Symposium on Network and Distributed Systems Security (NDSS '02), San Diego, Calif., February 2002.

[2] S. M. Bellovin and M. Merrit. Encrypted key exchange: Password-based protocols secure against dictionary attacks.

[3] M. Cagalj, S. Capkun, and J.-P. Hubaux. Key agreement in peer-to-peer wireless networks. Proceedings of the IEEE (Special Issue on Security and Cryptography), 94(2), 2006.

[4] M. Cagalj, S. Capkun, R. Rengaswamy, I. Tsigkogiannis, M. Srivastava, and I.-P. Hubaux. Integrity (I) codes: Message integrity protection and authentication over insecure channels. In IEEE Symposium on Security and Privacy, May 2006.

[5] H. Chan, R. Anderson, and A. Perrig. Key infection: Smart trust for smart dust. In Proceedings of IEEE International Conference on Network Protocols, May 2004.

[6] H. Chan, A. Perrig, and D. Song. Random key predistribution schemes for sensor networks. In IEEE Symposium on Security and Privacy, May 2003.

[7] ChipCon Products from Texas Instruments. CC2420 Data Sheet.

[8] Concentric Technology Solutions. RF Shield Box. http://www.rfshieldbox.com/RFProductS.htm.

[9] W. Diffie, P. C. van Oorschot, and M. J. Wiener. Authentication and authenticated key exchanges. Designs, Codes and Cryptography, pages 107-125, 1992.

[10] W. Du, J. Deng, Y. S. Han, and P. K. Varshney. A pairwise key pre-distribution scheme for wireless sensor networks. In ACM CCS 2003, pages 42-51, October 2003.

[11] L. Eschenauer and V. D. Gilgor. A key-management scheme for distributed sensor networks. In Proceedings of the 9th ACM Conference on Computer and Communication Security, pages 41-47, November 2002.

[12] C. Karlof, N. Sastry, and D. Wagner. TinySec: A link layer security architecture for wireless sensor networks. In Proceedings of ACM Conference on Embedded Networked Sensor Systems (SenSys), November 2004.

[13] D. Liu and P. Ning. Establishing pairwise keys in distributed sensor networks. In ACM CCS 2003, pages 52-61, October 2003.

[14] D. Liu, P. Ning, and W. K. Du. Group-based key pre-distribution in wireless sensor networks. In Proceedings of WiSe, April 2005.

[15] J. P. Lynch and K. Loh. A summary review of wireless sensors and sensor networks for structural health monitoring. Shock and Vibration Digest, 38(2):91-128, 2005.

[16] J. McCune, A. Perrig, and M. K. Reiter. Seeing-Is-Believing: Using camera phones for human-verifiable authentication. In Proceedings of IEEE Symposium on Security and Privacy, May 2005.

[17] A. Perrig, R. Szewczyk, V. Wen, D. Culler, and J. D. Tygar. SPINS: Security protocols for sensor networks. Wireless Networks, 8(5):521-534, September 2002.

[18] M. Ramjumar and N. Memon. An efficient key pre-distribution scheme for ad hoc network security. In Proceedings of IEEE Journal of Selected Areas in Communications, March 2005.

[19] T. Rappaport. Wireless Communications: Principles & Practice. Prentice-Hall, 2001.

[20] Sensys Networks. Components: VSN240 vehicle sensor nodes. http://www.sensysnetworks.com/vsn240.html.

[21] F. Stajano. Frank Stajano: The Resurrecting Duckling—What Next? In Proceedings of Security Protocols Workshop 2000, 2000.

[22] F. Stajano and R. Anderson. The resurrecting duckling: Security issues for ad-hoc wireless networks. In B. Christianson, B. Crispo, and M. Roe, editors, Security Protocols, 7th International Workshop. Springer Verlag, 1999.

[23] YSI Environmental. Environmental products. http://www.ysi.com/index.html.

[24] ZigBee Alliance. ZigBee Specification. Technical Report Document 053474r06, Version 1.0, ZigBee Alliance, June 2005.

Appendix 1 illustrates sample instructions for the end user for key deployment. Note that we modified the terminology for end users: the keying device is called the Secret Keeper; the beacon is called the Controller; and the new node is called the Numbered mote.

APPENDIX 1

Each mote has three color LEDs: Red,
Green, and Blue.
You will be working with three types of
motes: Controller, Numbered, Mote, Secret
Keeper.
Step 1.
Verify that all three LEDs (red, green, and
blue) on the Controller and the Secret
Keeper are blinking simultaneously.
Gently place the Numbered mote in the
container.
Step 2.
Screw the cap on the container snugly.
When no radio signals can escape the container, the Controller's blue LED will be lit.
Step 3.
Wait until the Controller begins to blink its
blue LED. This should take about 5 seconds.
Step 4.
Open the container and remove the Numbered
mote. Record the result on the Results
page.

If the Controller's green LED is lit,
encryption keys were successfully
exchanged.
If the Controller's red LED is lit, the
key exchange process was not successful.
It does not matter what color (if any)
the Numbered mote is lit.

What is claimed is:

1. A computer-implemented method of securely deploying information to a receiving device, comprising:
placing a receiving device in a faraday cage having a keying device positioned therein, said keying device containing the information to be deployed including a cryptographic key and a hash of the cryptographic key;
closing the faraday cage;
transferring the information wirelessly from the keying device to the receiving device using a computer and, while said transferring is taking place, interfering with the method of the transferring the information outside of the faraday cage;
monitoring, using the computer, inside of the Faraday cage for background emissions in a medium used for transferring the information to ensure the faraday cage is closed;
concluding said transferring and interfering; and
opening the faraday cage.

2. The method of claim 1 additionally comprising communicating whether the faraday cage is open or closed to a device causing the interfering by one of detecting a position of a switch or sensing an end of timing messages sent between the keying device and the device causing the interfering.

3. The method of claim 1 wherein said transferring the information occurs through one or more messages.

4. The method of claim 1 wherein a power level of said transferring is lower than a power level of said interfering.

5. The method of claim 1 wherein said transferring the information includes transferring the information through electronic transmission and wherein said interfering includes jamming a frequency of said electronic transmission.

6. The method of claim 5 wherein a power level of said electronic transmission is less than a power level of said jamming.

7. The method of claim 5 wherein said electronic transmission includes wireless transmission, and wherein said wireless transmission excludes spread spectrum transmissions.

8. The method of claim 1, wherein said placing a receiving device in the faraday cage includes placing a plurality of receiving devices in the faraday cage, and wherein the transferring the information from the keying device to the receiving device includes one of transferring the same information to each of the plurality of receiving devices or transferring unique information to each of the plurality of receiving devices.

9. The method of claim 8 additionally comprising,
determining a number of receiving devices;
conveying the number of receiving devices to said keying device; and
calculating a time for transferring the information based on the number of receiving devices.

10. The method of claim 9 wherein said determining the number of receiving devices comprises obtaining a weight of the plurality of receiving devices and calculating the number of receiving devices based on the weight of the plurality of receiving devices.

11. The method of claim 9 additionally comprising said keying device assigning an index number to each of said plurality of receiving devices.

12. A method of securely deploying information to a device, comprising:
placing a device into a faraday cage;
exchanging messages between a keying device located inside said faraday cage and a beacon located outside of said faraday cage;
closing said faraday cage to isolate the keying device and terminate said exchanging of messages;
upon terminating said exchange of messages, said keying device transferring wirelessly said information via one or more messages to said device and, while said transferring is taking place, said beacon interfering with said transferring, said information including a cryptographic key and a hash of the cryptographic key;
monitoring inside of the faraday cage for background emissions in a medium used for transferring said information to ensure the faraday cage is closed;
opening said faraday cage; and
exchanging at least one message between said device and said beacon to verify a secure deployment of the information.

13. The method of claim 12 wherein a power level of said transferring is lower than a power level of said interfering.

14. The method of claim 12 wherein said transferring the information includes transferring the information through electronic transmission and wherein said interfering includes jamming a frequency of said electronic transmission.

15. The method of claim 14 wherein a power level of said electronic transmission is less than a power level of said jamming.

16. The method of claim 14 wherein said electronic transmission includes wireless transmission, and wherein said wireless transmission excludes spread spectrum transmissions.

17. The method of claim 12 wherein said exchanging of at least one message to verify the secure deployment of the information comprises confirming that said beacon was interfering during said transferring of the information.

18. The method of claim 12 additionally comprising said beacon providing a signal to open the faraday cage after a passage of a predetermined time sufficient to enable the transfer of the information.

19. The method of claim 12 additionally comprising:
activating the cryptographic key by said beacon transmitting a last segment of key information to said device, said device computing the cryptographic key and computing a hash of the cryptographic key, said device comparing said computed hash of the cryptographic key to the received hash of the cryptographic key.

20. The method of claim 12, wherein said placing a device into the faraday cage includes placing a plurality of devices into the faraday cage, and wherein the transferring the information from the keying device to the device includes one of transferring the same information to each of the plurality of devices or transferring unique information to each of the plurality of devices.

21. The method of claim 20 additionally comprising,
determining a number of devices; conveying the number of devices to said keying device; and
calculating a transmission time for transferring the information based on the number of devices.

22. The method of claim 21 wherein said determining the number of devices comprises obtaining a weight of the plurality of devices and calculating the number of devices based on the weight of the plurality of devices.

23. The method of claim 21 additionally comprising said keying device assigning an index number to each of said plurality of devices.

* * * * *